US007139389B2

(12) United States Patent
Duncan

(10) Patent No.: US 7,139,389 B2
(45) Date of Patent: Nov. 21, 2006

(54) SYSTEM AND METHOD FOR ALLOCATING CONTACT RESOURCES TO CONTACT RESOURCE USERS

(76) Inventor: Daniel Neal Duncan, 2704 Barton's La., Austin, TX (US) 78746

( * ) Notice: Subject to any disclaimer, the term of this patent is extended or adjusted under 35 U.S.C. 154(b) by 612 days.

(21) Appl. No.: 10/212,817

(22) Filed: Aug. 6, 2002

(65) Prior Publication Data

US 2004/0028210 A1     Feb. 12, 2004

(51) Int. Cl.
*H04M 3/00*     (2006.01)
(52) U.S. Cl. .................... 379/265.01; 379/265.02; 379/265.09
(58) Field of Classification Search ........... 379/211.01, 379/211.02, 218.01, 265.02, 265.03, 265.05, 379/265.06, 265.09, 266.07
See application file for complete search history.

(56) References Cited

U.S. PATENT DOCUMENTS

| 5,329,578 | A | * | 7/1994 | Brennan et al. | ....... 379/211.03 |
| 5,850,433 | A | * | 12/1998 | Rondeau | ................ 379/218.01 |
| 5,889,799 | A | * | 3/1999 | Grossman et al. | ..... 379/266.08 |
| 5,978,465 | A | * | 11/1999 | Corduroy et al. | ...... 379/265.02 |
| 6,137,873 | A | * | 10/2000 | Gilles | .................... 379/202.01 |
| 6,311,231 | B1 | * | 10/2001 | Bateman et al. | ....... 379/265.09 |
| 6,389,132 | B1 | * | 5/2002 | Price | ..................... 379/265.01 |
| 6,493,446 | B1 | * | 12/2002 | Cherry | .................. 379/265.05 |
| 6,526,135 | B1 | * | 2/2003 | Paxson | .................. 379/218.01 |
| 6,704,396 | B1 | * | 3/2004 | Parolkar et al. | ......... 379/88.17 |
| 6,721,401 | B1 | * | 4/2004 | Lee et al. | ................ 379/93.17 |
| 6,785,380 | B1 | * | 8/2004 | Ribera | .................... 379/265.09 |
| 6,856,679 | B1 | * | 2/2005 | Pennington et al. | ... 379/265.01 |

* cited by examiner

*Primary Examiner*—Bing Q. Bui
(74) *Attorney, Agent, or Firm*—Hamilton & Terrile, LLP; Robert W. Holland

(57) ABSTRACT

A system and method for allocating contact resources provides a platform for communicating contact resource availability from contract resource sources to contact resource users and for procurement of the available contact resources by contact resource users. Procurement of contact resources is supported by quality control that trains, certifies and monitors contact agents to provide assurance to contact resource users of a defined standard of contact quality. Routing of contacts is coordinated through physical medium to support a schedule of procured resources. Speech-to-text resources aid contact communications and quality.

36 Claims, 3 Drawing Sheets

SYSTEM AND METHOD FOR ALLOCATING CONTACT RESOURCES TO CONTACT RESOURCE USERS

BACKGROUND OF THE INVENTION

1. Field of the Invention

The present invention relates in general to the field of electronic communications, and more particularly to a system and method for allocating contact resources for use by contact resource users.

2. Description of the Related Art

Telephone contact centers have grown in number over the past several years with greater reliance by businesses on contact centers for sales, marketing and customer service. In fact, worldwide the call center market is predicted to grow at a 16% annual compound rate, with some estimates of as high as 3.7 million contact center agents employed in the United States by 2004. Even greater growth rates are expected in less mature markets, such as the European Union, Latin America and Asia. Contact centers generally use electronic communications, such as the telephone, to initiate outbound contacts or respond to inbound contacts with customers or potential customers.

In telephone contact centers, contact agents typically establish voice communications with contacted individuals by using automated contact devices. For instance, predictive dialers dial outbound contact attempts and forward successful contacts to agents at a rate designed to keep agents occupied talking with contacts. Automated Call Distributor (ACD) and interactive voice response units (IVR) accept inbound contact attempts by callers and forward the inbound attempts to agents as the agents become available. However, automatic contact devices are expensive to purchase and maintain. Further, hiring, training and retaining agents to respond to contacts represent a substantial investment in labor, with labor representing the majority of the cost of running a call center operation.

Typical business needs for contact resources are often better served by outsourcing the contact resource needs to third parties. For instance, businesses may prefer to allocate capital to core competencies rather than for the purchase of contact devices. However, in purchasing contact resources businesses typically show a great deal of caution since customer attrition or lost sales from poor service by contact agents typically costs more than servicing costs themselves. When purchasing contact resources, buyers tend to err towards higher cost services either by accepting the much higher costs of direct support of contact resources or purchasing contact resources from more expensive recognized brand companies with whom they have a positive work experience. Even more expensive service is no guarantee of good quality contact service. Conversely, sellers of outsourced contact resources have difficultly making inroads with contact resource users. Thus, sellers of contact resources face slow growth and substantial investments in brand and image building until buyers of contact resources recognize the sellers and associate quality service with them.

SUMMARY OF THE INVENTION

Therefore a need has arisen for a system and method that allocates available contact resources to contact resource users in an efficient and cost effective manner.

A further need exists for a system and method that coordinates contact resources with contact resource users with secure and robust routing to reduce the complexity of arranging outsourcing of contact services.

A further need exist for a system and method that coordinates the use by contact users of contact resources owned and operated by third parties.

A further need exists for a system and method that coordinates call center agent work schedules to allow agents to bid on times and campaigns that best suit their work habits.

A further need exists for a system and method that reduces voice communication confusion between agents and contacts due to language, geographical and cultural differences.

In accordance with the present invention, a system and method are provided which substantially reduce or eliminate the difficulties and problems associated with previously known systems and methods for allocating contact resources to contact users. A contact system allocater supports a contact resource procurement network to coordinate the sale of available contact resources to contact resource users and to route voice and data to support contacts between contact resource sources, contact resource users and contacted individuals.

More particularly, a procurement module accepts offers to sell or buy available contact resources from contact resource sources and matches the available contact resources with bids to purchase from contact resource users, such as with a market, auction or negotiation process. The procurement module provides contact resource buyers with uniform quality control information to normalize the different contact resources and make the purchase process more uniform and simple. A routing module coordinates routing of contacts through secure infrastructure to make contact resource user purchase decisions essentially independent of geography. A contact resource quality control module provides contact agent training and certification and tracks contact agent performance to provide uniform quality comparisons for contact resource users. In one embodiment, speech-to-text and text-to-speech translation reduces voice communication difficulty in the face of language or cultural differences between agents and contacts to improve quality of contact service.

The present invention provides a number of important technical advantages. One example of an important technical advantage is that contact resources are allocated in an efficient manner, thus reducing the cost to the contact resource user. Lower costs result from an efficient competitive bidding process, reduced risk related to changes in contact resource vendors and reduced capital investment. Contact resource users require fewer people and less equipment to manage the relationship between them and their suppliers. Suppliers also have corresponding reductions in cost due to reduced marketing and interest expense.

Another example of an important technical advantage is that contact resource allocations are supported with virtual routing of voice and data to support contacts. A uniform technology infrastructure simplifies the day-to-day and long-term management of supplier relationships. Moreover, the infrastructure supports faster business decisions, which becomes an asset rather than an impediment to change.

Another example of an important technical advantage is that contact agents have greater flexibility to work as independent contractors of their services free from permanent ties to hardware infrastructure. For instance, agents may interact from home computers based on individual agent qualifications for particular contact resource users. This reduces the expense of hiring agents through middlemen and also provides greater flexibility and job satisfaction to agents. Further, contact resource users may track and hire preferred agents based on job performance or based on quality ratings.

Another example of an important technical advantage of the present invention is the reduced barriers due to agent language and cultural differences from the contacts. For instance, a speech-to-text and text-to-speech capability smooths out voice communication between agents and contacts. In one embodiment, voice recognition of agent speech reduces bandwidth use by sending text instead of voice data and also reduces contact confusion by providing a uniform automated voice from a text-to-voice translation. In another embodiment, common phrases are generated by agent keypad entries to further reduce dependence on understanding of voice communication by contacts.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Preferred embodiments of the present invention are illustrated in the figures, like numerals being used referred to like and corresponding parts of the various drawings.

Contact resources typically represent substantial investments in fixed locations that are often less than fully utilized. The present invention provides a contact resource procurement network that introduces contact resource sellers to contact resource buyers, thus improving the utilization of contact resources while reducing the need for contact resource users to invest in contact resource devices. The procurement network reduces barriers to the exchange of contact resources by providing a secure exchange network, assurances of quality contact resource services, automated invoices and remittance, and automated configuration of contact resources to handle a contact campaign.

Figure 1:
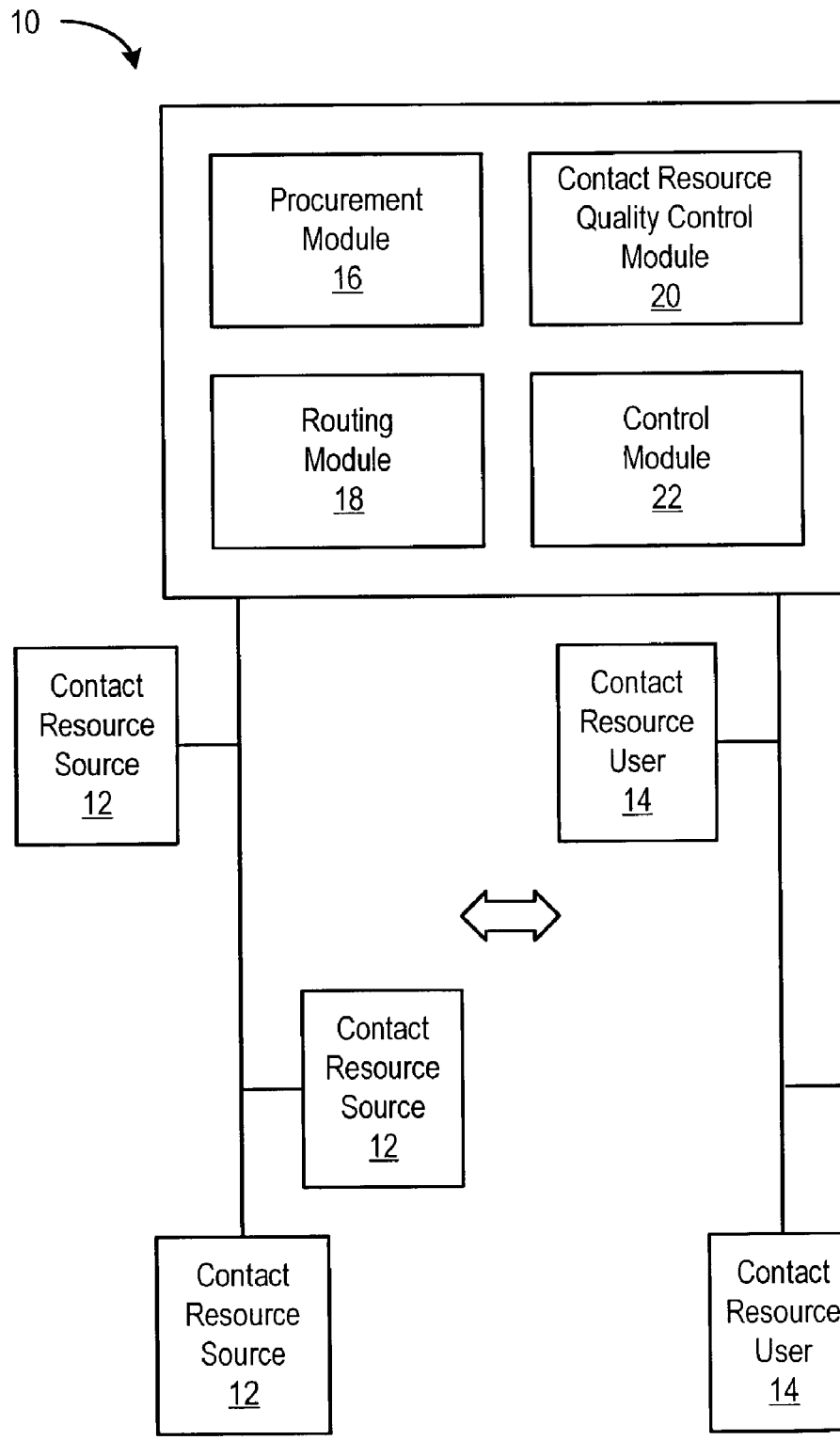
FIG. 1 depicts a block diagram of a contact resource allocater.

Referring now to FIG. 1, a block diagram depicts a contact resource allocater 10 for allocating contact resources to contact resource users based on availability, price, quality of contact skills, and data and voice transmission routing. Contact resource allocater 10 arranges the purchase, distribution and normalization of contact resources, such as calling center agent capacity for placing outbound telephone calls or answering inbound telephone calls. Contact resource allocater 10 provides: an auction site to exchange contact resources; a scheduling package to coordinate call center agent work schedules in a cost-effective manner; a communication hub to coordinate voice and data transfers between contact users, contact resource sources and contacted individuals as well as provide contact resource devices for use by contact resource sources; a remittance capability to improve the payment processing between buyers and sellers of contact resources; and training tools to ensure contact resource capabilities and quality. Thus contact resource users are provided with a turnkey solution to purchase and schedule contact resources while avoiding large capital investments and labor costs associated with calling centers, and contact resource sources are provided with access to a customer base while avoiding marketing costs and costs associated with arranging network connections.

Contact resource allocater 10 supports communication between contact resource sources 12 and contact resource users 14 through a central communication point, such as a server interfaced with the Internet, or distributed communication points, such as geographically dispersed servers in communication with each other. A contact resource source is the physical medium for connecting contacts with agents and the agents to make the contacts, such as is typically available from a calling center with outbound or inbound contact devices that communicate with individuals over telephone or computer networks. A contact user is typically a business desiring to contact and communicate with individuals, such as customers or potential customers who are called by the business, such as for marketing or solicitation, or who call into the business, such as to seek information or make a purchase. In some instances, several contact resources may be combined to support a contact user. For example, a contact user may purchase from separate contact resource sources the physical medium for performing contacts and the agent labor for communicating with contacts.

Contact resource allocater 10 coordinates physical medium and labor exchanges to support contact campaigns through a procurement module 16 and a routing module 18. Procurement module 16 provides a platform for the buying and selling of contact resources. For instance, ask and bid prices are posted for contact resources or an auction may be held for a given contact resource. In one embodiment, individual agent availability is posted in ask and bid prices for specific work schedules to allow a contact resource user to separately purchase dialing or answering infrastructure and agents to handle contacts. Thus, individual agents may set up specific work schedules based on contact user demand. To support the contact resource exchange process, a contact resource quality control module 20 tracks contact resource capabilities, such as calling center agent training and certification, and provides the quality control information to contact resource users. A control module 22 controls the operation of the platform that supports contact resource allocater 10, such as by monitoring access and security.

Figure 2:
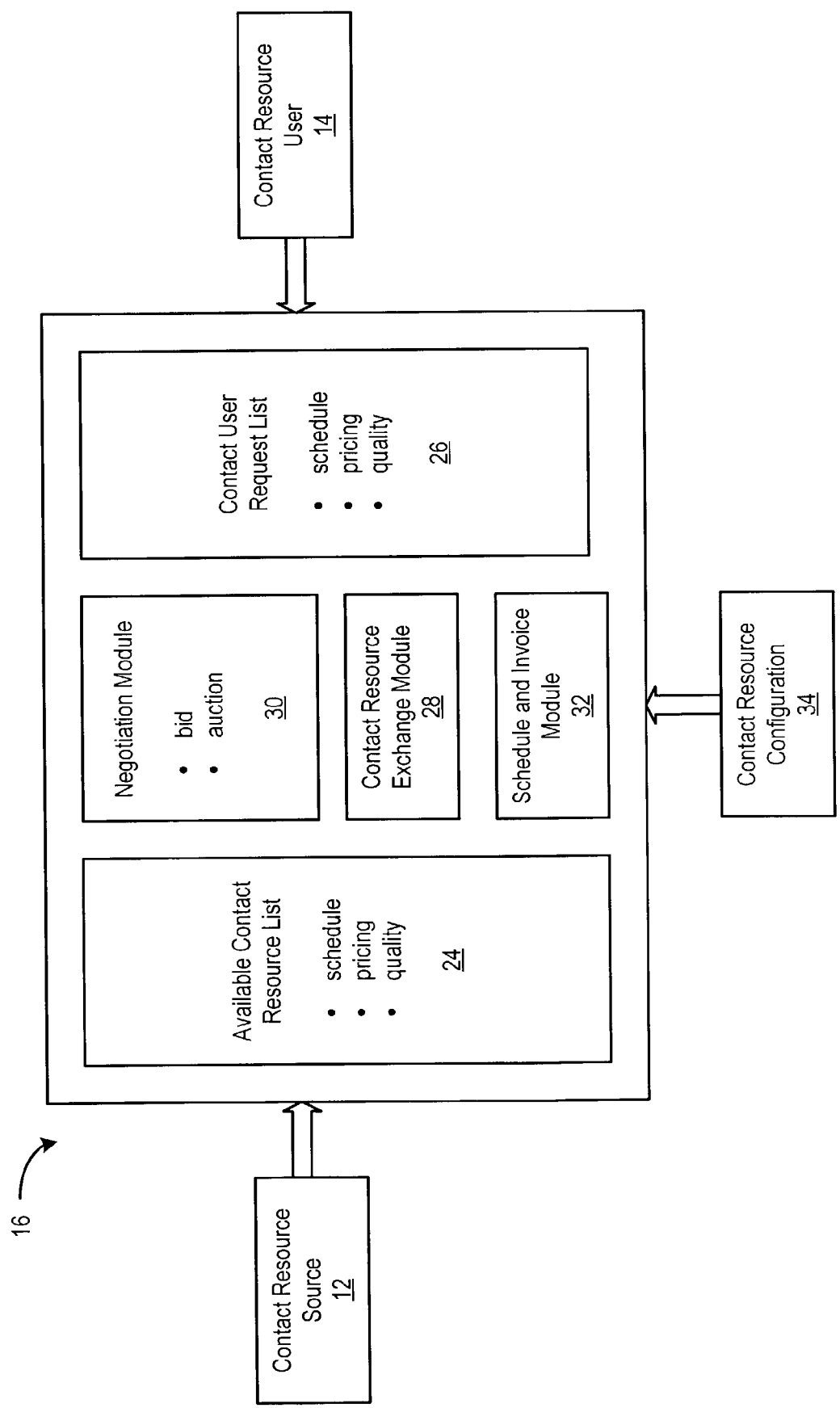
FIG. 2 depicts a block diagram of a contact resource procurement module.

Referring now to FIG. 2, a block diagram depicts one embodiment of procurement module 16 for exchanging contact resources. Contact resource sources 12 interface with procurement module 16, such as through the Internet, to post contact resources as available for purchase by contact resource users 14. Alternatively, contact resource users 14 may post opportunities for bids by contact resources sources 12 along with calling campaign requirements. For instance, contact resource source 12 is presented with an HTML Web page to input information into an available contact resource list 24. As examples, contact resource source 12 may post blocks of time available for rent from a calling center as a pooled resource, including contact devices and agents associated with contact devices, or may post time available for pools of contact devices or agents as separate items. Alternatively, individual contact agents may post their availability as agents, for example offering to connect to contact devices to service contacts from home offices at certain times of the day. Available contact resource list 24 includes pricing, scheduling and quality control information for review by contact resource users. Similarly, contact resource users 14 interface with procurement module 16 to post information on a contact user request list 26, such as requests for contact resources with desired schedule, price and quality parameters.

Transactions of contact resources between contact resource sources 12 and contact resource users 14 are managed with a contact resource exchange module 28, a negotiation module 30 and a schedule and invoice module 32 to output a contact resource configuration 34. Contact resource exchange module 28 consummates agreements between sellers and buyers of contact resources through a variety of contractual arrangements. For instance, contact resource exchange module 28 may arrange to have a contact resource user agree to purchase contact resources at an offered price from one or more contact resource sources, or may have a contact resource source agree to sell contact resources at a bid price from one or more contact resource users. Alternatively, contact resource exchange module 28 may provide an auction sale process in which sellers or buyers of contact resources bid against other sellers or buyers to sell or buy defined contact resources. Contact resource exchange module 28 provides an Internet-based procurement process that reduces transaction costs and provides improved pricing information for both buyers and sellers. In some instances, further communication between buyers and sellers may be needed, such as to discuss specific calling campaign or other issues. A negotiation module 30 supports such communication as bulletin boards available to interested buyers and sellers, chat rooms or e-mails for defined lists of buyers and sellers, or instant messages that aid one-on-one communication, such as due diligence by buyers to evaluate contact resource quality. Once an exchange is made, a schedule and invoice module 32 schedules contact resources and arranges remittance, such as with invoices or direct account debits, from purchasers for the agreed price and both purchasers and sellers for use of the platform. In one embodiment, a holdback on payments is permitted to aid subsequent disputes regarding contact services, such as poor quality, with dispute resolution available by review of records from the purchased contact services. A contact resource configuration 34 is then sent to the scheduled contact resources.

Figure 3:
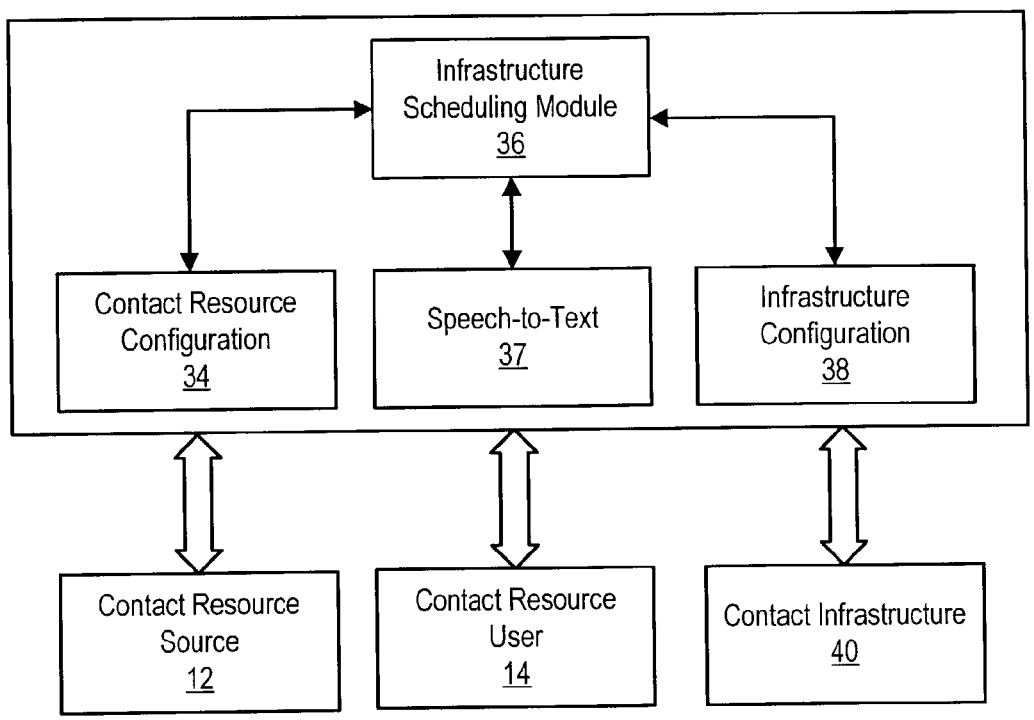
FIG. 3 depicts a block diagram of a contact resource routing module.

Referring now to FIG. 3, a block diagram depicts a routing module 18 for coordinating physical medium to support the use of exchanged contact resources. Routing module 18 fulfills contact resource exchanges by facilitating the contact resource exchanges with integration of voice and data transmissions between buyers and sellers of contact resources and by facilitating the interaction of contact resources with selected contact individuals, such as outbound call lists or inbound calling lines. Routing module 18 provides a virtual routing capability, controllable by contact resource users or sources and integrated with procurement of the contact resources to ensure reliable, safe, secure and robust physical medium for carrying voice and data between all parties. In one embodiment, routing module 18 arranges the resale of long distance phone lines or transmission bandwidth to complete contact campaigns, and otherwise arranges the purchase of hardware and software resources to accomplish a contact campaign. For instance, to support the use of an overseas contact resource to conduct a local calling campaign, routing module 18 may arrange a common bridge between onshore and offshore infrastructures or hub locations near contact resource sources of agents, such as credit agencies.

During or after procurement of contact resources 12 by contact resource users 14 with procurement module 16, routing module 18 accepts the contact resource configuration 34 and coordinates scheduling of physical medium to support the contact resource schedule with an infrastructure scheduling module 36. Infrastructure scheduling module 36 tracks availability of physical medium, such as bandwidth and switching capacity, and schedules available infrastructure to accomplish contact resource schedule 34 in as cost effective and efficient a manner as available. For instance, reserved infrastructure provides a secure network within a closed system that allows contact resources to change contact routing as contact resource user bids are accepted, essentially enabling a virtual switching and routing capability. Infrastructure scheduling module 36 generates an infrastructure configuration 38 which routing module 18 provides to the scheduled contact infrastructure 40. The scheduled contact infrastructure 40 confirms availability with contact resources 12 and acceptability with contact resource user 14.

In one embodiment, a speech-to-text module 37 configures speech-to-text and text-to-speech capability to support agent communication with contacts. Communication from the agent is sent in text form to a conversion device and then translated to an automated voice for the contact. For instance, voice recognition translates agent voice signals to text signals to reduce the amount of information sent and to effectively filter out the agents accent by training the voice recognition to adjust for accent in the text translation. Alternatively, many scripts include repeated phrases that are recorded to allow the agent to communicate by selecting a script to play for the contact. Speech-to-text module 37 arranges infrastructure proximate to the contact's network that accepts the text transmissions and translates them to voice signals for the contact. A similar translation may be used for voice signals from the contact to the agent.

Some examples of routing for infrastructure will aid in the understanding of the functions available from routing module 18 to effectively remove contact resource geography as a factor in contact resource allocation. For instance, a one-to-one communication network between contact resource users and contact resources is unnecessary. Routing module 18 may move data and voice between two parties over a private network or the public internet based on a cost/quality analysis. Routing module 18 reduces the need for dedicated network equipment, dedicated telecommunications circuits, project management, network programming, firewall administration and specific knowledge by either party regarding the operation of the computing or network environment. In addition, routing may include support for alternative forms of communication in addition to or instead of voice communication, such as e-mail, instant messaging and collaborative browsing.

Figure 4:
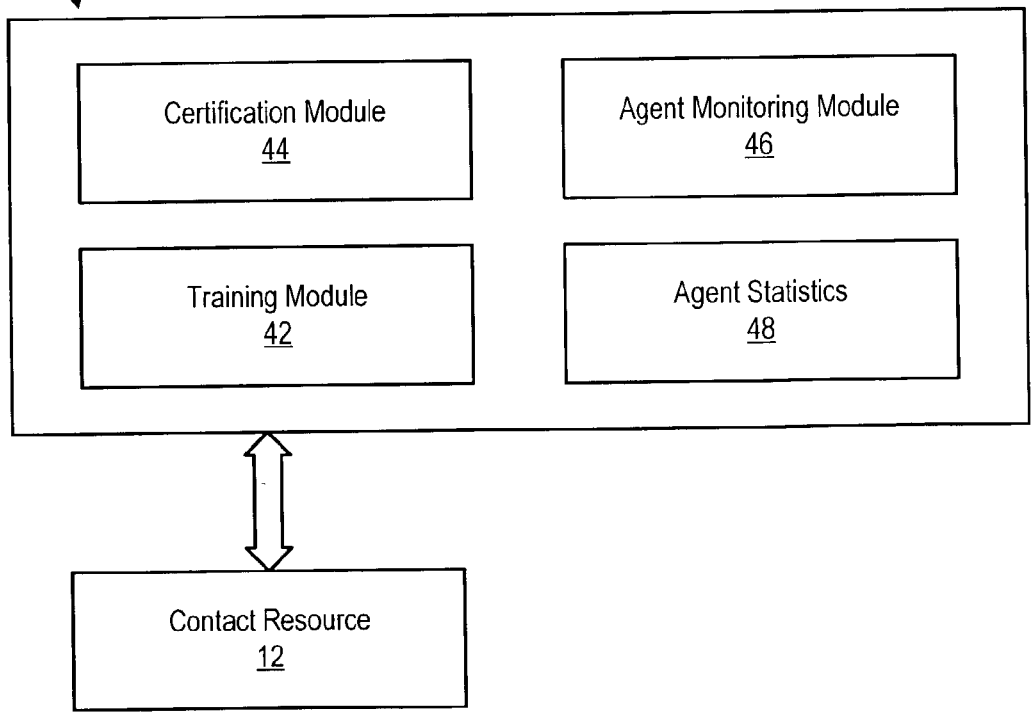
FIG. 4 depicts a block diagram of a contact resource training module.

Referring now to FIG. 4, a block diagram depicts a contact resource quality control module 20 for coordinating training and certification of contact resources and for tracking contact resource performance and reporting that performance to contact resource users. Contact resource quality control module 20 normalizes contact agent quality by providing a uniform basis for comparison, thus mitigating contact resource buyer risk in purchasing contact resources, especially from international sources. Such a uniform basis for comparison of contact resource quality is an important consideration for buyers and aids in making contact resources a commodity exchanged primarily on price considerations. Contact resource quality control module 20 monitors quality with training provided to contact resources, certification of contact resources to defined quality levels and tracking of quality control statistics at a contact resource and contact agent level.

A training module 42 provides training to contact agents in general and for specific contact activities. For instance, contact agents interface with training module 42 to obtaining general training in language and diction skills. Such general language training is of particular importance when a contact agent is using a second language to communicate with contacts. Specific training includes training for identified contact interface tasks, such as using outbound and inbound contact interfaces, or training for specific contact resource users. A certification module 44 includes standards that a contact agent may achieve to become certified for a contact task. For instance, if voice recognition training software indicates that a contact agent has adequate diction in English, certification module 44 certifies the contact agent to respond to contacts in English-speaking countries. Alternatively, if a contact agent shows adequate proficiency in responding to contacts for an identified contact user, the contact agent is granted certification to handle contacts for that user. An agent monitoring module 46 tracks statistics on agent performance based on actual contact results. In addition, agent monitoring module 46 may track agent performance for billing purposes. Further, agent monitoring module may allow live or recorded evaluation of agents handling contacts. An agent statistics module 48 stores the statistics and provides them to contact resource users for making contact resource purchase decisions, or for monitoring existing transactions.

Although the present invention has been described in detail, it should be understood that various changes, substitutions and alterations can be made hereto without departing from the spirit and scope of the invention as defined by the appended claims.

What is claimed is:

1. A system for allocating contact resources and contact resource users, the system comprising:
    a procurement module operable to accept contact resource availability from plural contact resource sources, each contact resource having plural agents for interacting with contacts, and to communicate contact resource availability to plural contact resource users, each contact resources user having plural contacts to interact with agents, the procurement module further operable to allocate selected contact resources to a contact resource user; and
    a routing module interfaced with the procurement module and operable to coordinate routing of selected contact resources for performing contacts determined by the contact resource user.

2. The system of claim 1 wherein the contact resources comprise outbound calling resources.

3. The system of claim 1 wherein the contact resources comprise inbound answering resources.

4. The system of claim 1 wherein the contact resources comprise Voice over Internet Protocol communication between an agent and a contact individual.

5. The system of claim 1 wherein the contact resources comprise e-mail messages.

6. The system of claim 1 wherein the contact resources comprise instant messages.

7. The system of claim 1 wherein the contact resources comprise collaborative browsing.

8. The system of claim 1 wherein the routing module comprises instructions for forwarding contact information from the contact resource user to the selected contact resources.

9. The system of claim 1 wherein the routing module comprises instructions for routing contact resources to contact individuals.

10. The system of claim 9 wherein the instructions route contacts through a private network.

11. The system of claim 9 wherein the instructions route contacts through the public telephone network.

12. The system of claim 1 wherein the procurement module further comprises:
    a contact resource exchange module operable to accept contact resource selections from a contact resource user and to allocate the selected contact resources to the contact resource user; and
    a scheduling module in communication with the contact resource exchange module and operable to schedule the selected contact resources and routing resources.

13. The system of claim 1 further comprising a contact resource quality control module operable to track contact resource quality and to provide contact resource quality to contact resource users.

14. The system of claim 13 wherein the contract resource quality control module is further operable to track contract resource utilization.

15. The system of claim 13 wherein the contact resource quality control module is further operable to track quality and utilization for payment remittance.

16. The system of claim 13 wherein the contact resource quality control module is further operable to train contact resources for one or more predetermined contact tasks.

17. The system of claim 13 wherein the contact resource quality control module is further operable to certify contact resources as qualified for one or more predetermined contact tasks.

18. A method for allocating contact resources and contact users, the method comprising:
    collecting contact resource availability at a contact resource allocater from plural contact resource sources, each contact resource source having plural agents to interact with contacts;
    providing the collected contact resource availability to plural contact resource users through the contact resource allocater, each contact resource having plural contacts to interact with agents;
    selecting contact resources for use by a contact resource user from the available contact resources; and
    allocating the selected contact resources to the contact resource user.

19. The method of claim 18 wherein selecting further comprises:
    negotiating contact resource use terms with the contact resource allocater.

20. The method of claim 18 wherein selecting further comprises:
    auctioning available contact resources to contact resource users.

21. The method of claim 18 wherein selecting further comprises:
    posting ask prices for contact resources; and
    purchasing of contact resources by a contact user by accepting selected contact resources at an ask price.

22. The method of claim 18 wherein selecting further comprises:
    posting bid prices for contact resources; and
    purchasing of contact resources by a contact user by accepting a selected contact user bid price.

23. The method of claim 18 wherein collecting contact resource availability further comprises:

associating contact routing infrastructure with the contact resource sources.

24. The method of claim 23 wherein allocating the selected contact resources further comprises:
defining routing for voice and data between the selected contact resources, contact users and the contacted individuals.

25. The method of claim 18 further comprising:
tracking quality associated with allocated contact resources; and
providing quality information to contact users to aid in the selecting of contact resources.

26. The method of claim 18 further comprising:
certifying contact resources for predetermined contact tasks; and
providing contact user certification information to contact resource users to aid in the selecting of contact resources.

27. The method of claim 26 wherein the contact tasks comprises outbound contacts.

28. The method of claim 26 wherein the contact tasks comprise inbound contacts.

29. A method for supporting communication between a contact agent and a contact, the method comprising:
generating a communication in text form by the contact agent;
transmitting the communication in text form through a network to an intermediate location between the contact agent and the contact;
translating the communication from text form to a voice signal;
and transmitting the voice signal to the contact.

30. The method of claim 29 wherein generating a communication comprises:
uttering the communication by the contact agent to a voice recognizer; and
translating the uttered communication to text form.

31. The method of claim 29 wherein generating a communication in text form comprises:
presenting a list of communications to the contact agent; and
selecting a communication from the list for transmission in text form.

32. A routing module for coordinating physical medium to support the use of procured contact resources, the routing module comprising:
a contact resource configuration that defines a schedule for the procured contact resources, the procured contact resources comprising plural agents operable to establish plural contacts;
an infrastructure scheduling module in communication with the contact resource configuration and operable to schedule available physical medium to meet the contact resource schedule; and
an infrastructure configuration interfaced with the infrastructure scheduling module and storing the schedule for the contact resources.

33. The routing module of claim 32 further comprising a speech-to-text module operable to define a speech-to-text resources for contacting individuals, the speech to text resources comprising a conversion device operable to convert text communication receive from a contact resource to speech communication and to forward the speech communication to a contacted individual.

34. The routing module of claim 32 wherein the physical medium comprises voice routing infrastructure.

35. The routing module of claim 32 wherein the physical medium comprises Voice over Internet Protocol resources.

36. The routing module of claim 32 wherein the physical medium comprises international contact resources to conduct a national calling campaign.

* * * * *